(12) United States Patent
Palese

(10) Patent No.: US 6,516,103 B1
(45) Date of Patent: Feb. 4, 2003

(54) OPTICAL INTERCONNECT CAPABLE OF PERFORMING ADDITION/SUBTRACTION

(75) Inventor: Stephen P. Palese, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/587,125

(22) Filed: Jun. 2, 2000

(51) Int. Cl.[7] .............................................. G02B 1/295
(52) U.S. Cl. ....................................................... 385/5
(58) Field of Search ............................... 385/5, 11, 116

(56) References Cited

U.S. PATENT DOCUMENTS 5,502,786 A * 3/1996 Inniss et al. .................. 385/11
5,734,470 A * 3/1998 Rogers et al. ............... 356/432

* cited by examiner

Primary Examiner—Tulsidas Patel
(74) Attorney, Agent, or Firm—Robert W. Keller

(57) ABSTRACT

An optical interconnect for use with a probe beam and optical signals is disclosed. The interconnect comprises an optical waveguide for propagating the probe beam, an optical transcription material that changes a characteristic of the probe beam at locations where the optical signals interact with the probe beam. A signal processor develops an output signal from the changed characteristic representative of the information contained in the optical signals. The optical signals may be amplitude or phase modulated or polarized. The interconnect can be configured to add and subtract the optical signals.

30 Claims, 7 Drawing Sheets

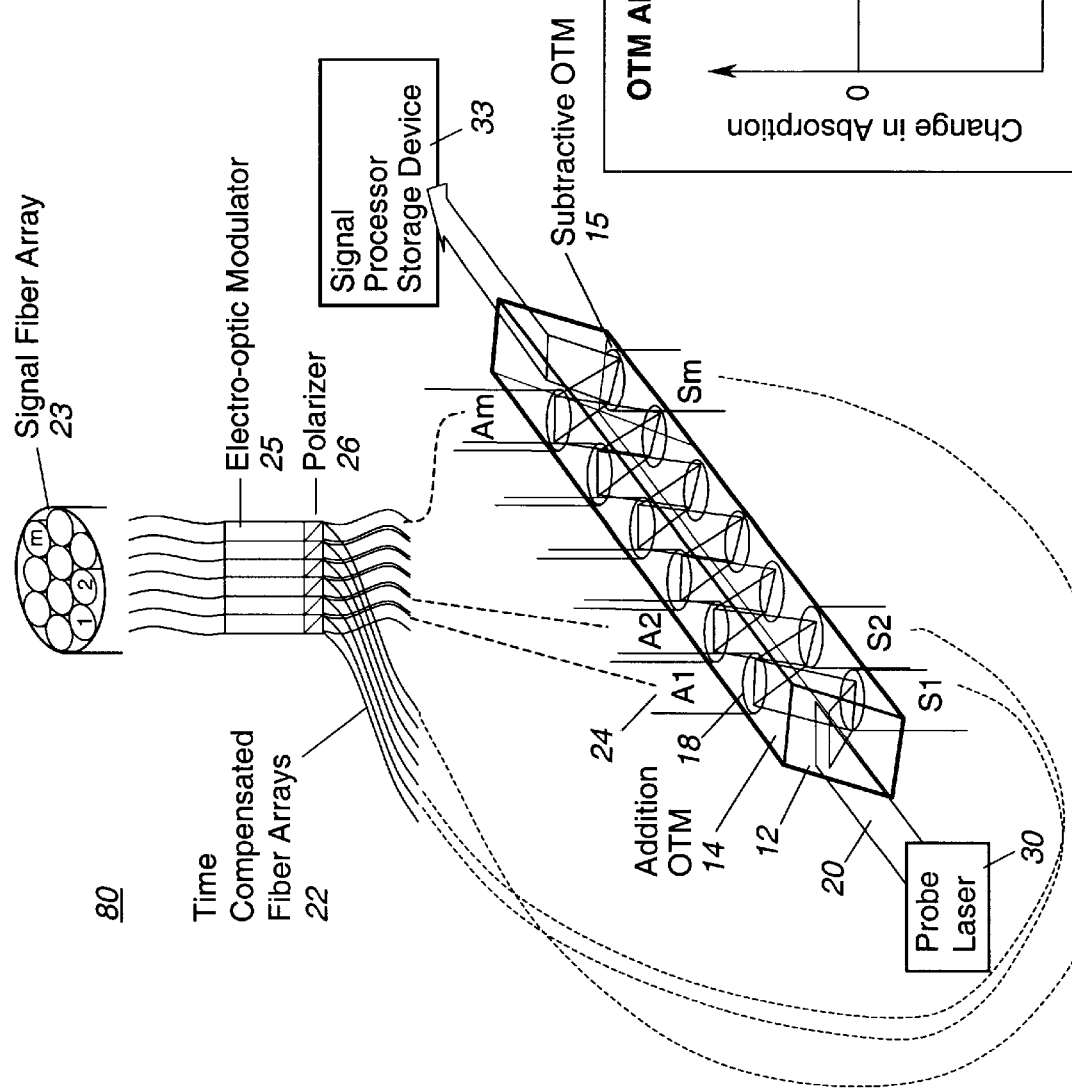

OPTICAL INTERCONNECT CAPABLE OF PERFORMING ADDITION/SUBTRACTION

CROSS-REFERENCES TO RELATED APPLICATIONS

The present application is related to co-pending U.S. patent application Ser. No. 09/586,014, filed Jun. 2, 2000, entitled: "Electro-Optic Device for Adding/Subtracting Optical Signals" by Stephen Palese, assigned to the same assignee as this present invention, and its contents are incorporated herein by reference.

The present application is also related to co-pending U.S. patent application Ser. No. 09/587,124, filed Jun. 2, 2000, entitled: "Optoelectronic Communication System In Turbulent Medium Having Array Of Photodetectors and Time Compensation" by Stephen Palese, assigned to the same assignee as this present invention, and its contents are incorporated herein by reference.

The present application is also related to co-pending U.S. patent application Ser. No. 09/586,513, filed Jun. 2, 2000, entitled: "High Bandwidth Large Area Optical Communication Receivers by Stephen Palese, assigned to the same assignee as this present invention, and its contents are incorporated herein by reference.

The present application is also related to co-pending U.S. patent application Ser. No. 09/587,126, filed Jun. 2, 2000, entitled: "Time Compensation Architectures for Controlling Timing of Optical Signals" by Stephen Palese, assigned to the same assignee as this present invention, and its contents are incorporated herein by reference.

BACKGROUND OF THE INVENTION

1. Field of the Invention

The present invention relates generally to optical devices, and more particularly to an optical interconnect that can be configured to add and subtract optical signals.

2. Description of the Art

The telecommunications industry is rapidly switching from electronic systems to hybrid platforms which utilize both electronics and photonics to increase the operational bandwidth. Today's electronic communication systems consist of electrical networks, microwave amplifiers, microwave transmitters, and high speed semiconductor receivers. There are numerous electrical devices available so this architecture works well in the confines of electronics. There are problems in moving to hybrid platforms, however, because few electro-optical devices are available to convert electrical signals into optical signals. Moreover, eventually as optical systems come into use, purely optical signal processing devices will be required.

What is needed, therefore, are more optical interconnects especially one that is capable of adding and subtracting optical signals directly, without conversion between electronic and optical architectures.

SUMMARY OF THE INVENTION

The present invention involves an optical interconnect that utilizes an optical transcription material, while maintaining a fast temporal response, and thus a high bandwidth. This device is applicable for phase modulated, amplitude modulated and polarized optical signals and responds to a separate signal beam and a probe beam.

The optical transcription material (OTM) which will be described subsequently in more detail, utilizes a linear or nonlinear optical pump-probe mechanism to relay the arithmetic information from the signal beam to the probe beam. The signal beam, also referred to as the pump beam, induces a time dependent index of refraction change, which is interrogated by a probe beam, also referred to as the reading beam. Through this mechanism, information which is encoded onto the signal beam is transcribed into polarization rotation, amplitude modulation or phase modulation of the probe beam. The optical interconnect speed is limited by the intrinsic response time of the OTM.

Briefly, the present invention comprises an optical interconnect, that can be configured for adding or subtracting two or more optical signals. The optical signals contain information which is amplitude, polarization or phase encoded. A probe laser generates an optical probe beam. The optical device includes an OTM that responds to the optical signals and the probe beam such that a characteristic of the probe beam is changed. A signal processor or detector senses the changed characteristic and develops an output optical signal representative of the summed or subtracted information contained in the input optical signals.

In other aspects, the present invention subtracts polarization multiplexed signal and reference beams and employs a time compensation architecture.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

BRIEF DESCRIPTION OF THE DRAWINGS

FIGS. 6A and B are graphs illustrating the absorption characteristics of the optical transcription material.

FIG. 7 diagrammatically illustrates yet another alternative embodiment of the waveguide optical interconnect shown in FIG. 1.

FIG. 8 is a graph illustrating the absorption/gain characteristic of the optical transcription material used in FIG. 7.

DETAILED DESCRIPTION OF THE PREFERRED EMBODIMENTS

Figure 1:
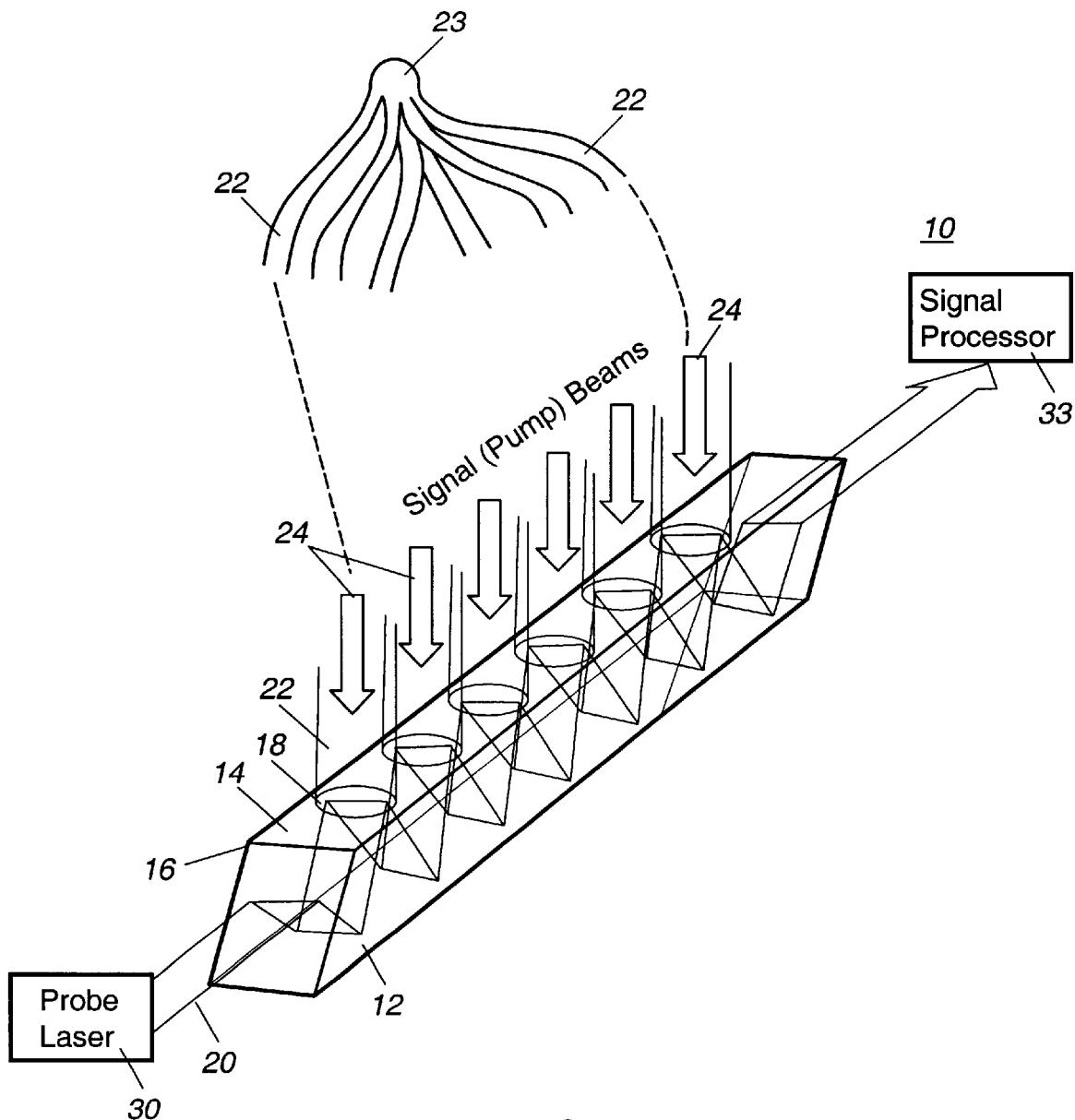
FIG. 1 is a diagram illustrating a waveguide optical interconnect in accordance with the present invention.
Figure 2:
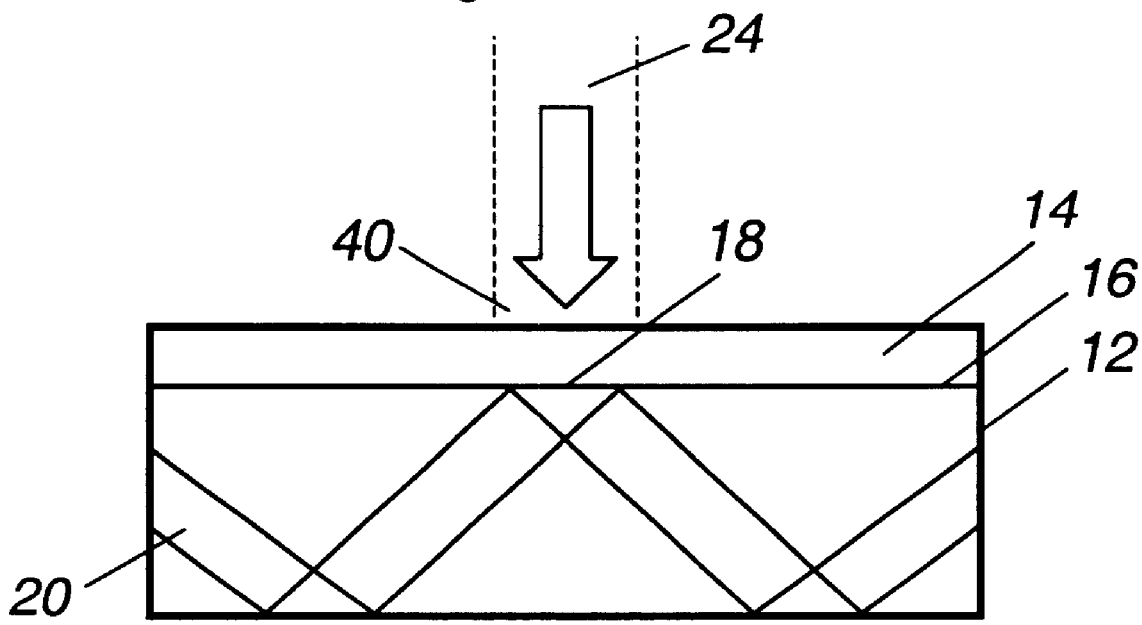
FIG. 2 is a side view diagrammatically illustrating the operation of the waveguide optical interconnect shown in FIG. 1.

As illustrated in the diagrams of FIG. 1 and FIG. 2, the present invention provides an optical device or interconnect, generally designated by the numeral 10. Briefly, the optical interconnect 10 comprises a waveguide optical interconnect 12 that is characterized by generally total internal reflection (TIR). More particularly, the optical waveguide 12, also referred to as a TIR device, includes a layer 14 of an optical transcription material (OTM) over a top surface 16. The thickness of the waveguide is selected such that certain modes of a probe beam hit the interaction areas 18 of the OTM 14 when a probe beam 20 is applied to an input port and propagated through the waveguide. Optical fibers 22 configured in an array 23 propagate signal beams 24 to the interaction areas 18. The optical fibers 22 extend from the signal fiber array 23 having m fibers. A signal processor 33 serves to process, manipulate, display, and store the output signals developed by the optical interconnect. A suitable optical storage device could be provided by Templex Incorporated.

A probe laser 30 transmits the probe beam 20 through an optical fiber to the input port of the optical waveguide 12. The probe beam is diffraction limited or near diffraction limited, may be characterized as having a Gaussian or Bessel waveform, and has a power in the microwatt range. This power is significantly lower than that of the signal beams 24.

The OTM element 14 is formed of a photoactive material, such as a polymer film that has a fast response (both rise time and recover time) to the optical signal beam. It interacts with a preselected frequency and has an index of refraction, n, that varies over time when it is probed with the probe beam. It serves to impart a phase shift or amplitude modulation to the probe upon photo-excitation of the OTM. Alternatively, it can be a wafer formed of a semiconductor material, such as silicon or gallium arsenide, that is sensitive to infrared radiation, other polymers (undoped or doped with donor or acceptor molecules), molecular crystals, biological and synthetic chromophore systems, or a superconductor material.

At the OTM 14 the signal beams 24 interact with the near diffraction limited probe beam 20 through a linear or non-linear optical process and impresses a modulation onto the probe beam through index of refraction variations in the OTM. Through this signal-probe mechanism, information which is encoded onto the signal beam is transcribed into modulation of the probe beam.

More particularly, and with reference to FIG. 2, the evanescent wave 40 of the probe beam 20 penetrates into the OTM at the interaction areas 18 and introduces either an amplitude or phase change on the probe in response to the index of refraction change, $\Delta n$, induced by the signal beam.

This optical interconnect is based on amplitude or phase variations which can be induced at TIR interaction surfaces 18. The exponentially damped evanescent wave 40 exists at a TIR interface and therefore can monitor index of refraction changes which occur on the other side of the boundary. This mechanism forms the basis for many chemical and biological fiber sensors. In these representations, the OTM 14 must be physically close to the TIR surface 16, respectively, such that the probe evanescent field penetrates into the interaction region 18 which is optically excited by the signal beams 24. This TIR surface can reside in a bulk optic or an optical waveguide.

The critical angle, $\theta_c$, for the TIR is $$\theta_c = \sin^{-1}\left(\frac{n_1}{n_2}\right)$$

Where $n_1$ and $n_2$ are the index of refraction of the two mediums comprising the waveguide 12 and the OTM 14, respectively.

The fiber optic array 23 is constructed such that each of the individual fibers 22 transmit the signal onto one site of the optical interconnect device which is coated with the OTM 14. The index of refraction variations of the optical transcription are material induced by the signal (pump) beam 24, and are translated into either amplitude or phase modulation of the probe. Polarization rotation of the probe can be accomplished by differential phase modulation along orthogonal OTM directions. If the index change at the probe wavelength is large enough that the critical angle requirement is no longer met by the probe, then a portion of the beam will be transmitted through the boundary layer and amplitude modulation will result. Phase modulation occurs if the index variation on the OTM is such that the requirement for critical angle at the TIR interface is still satisfied by the probe beam. This change $\Delta \phi$ can be expressed as $$\Delta \phi = \frac{1}{n_1} \frac{\partial \phi}{\partial n} \Delta n_2$$

where $n_1$ is the index of the TIR optic or waveguide and $n_2$ is the index of the optical transcription material. For the two cases where the electric field is either perpendicular or parallel to the plane of incidence $$\frac{\partial \phi_\perp}{\partial n} = -\sin\phi_\perp \left(\frac{n}{\sin^2\theta - n^2}\right)$$

$$\frac{\partial \phi_\parallel}{\partial n} = -\sin\phi_\parallel \left(\frac{n}{\sin^2\theta - n^2} + \frac{2}{n}\right)$$

For a typical TIR optical interconnect $\theta=55°$, $n_1=1.8$ and $n_2=1.3$ the phase shifts are approximately $$\partial \phi \perp \approx 4.4 \Delta n_2$$

$$\partial \phi \| \approx 7.6 \Delta n_2$$

for parallel and perpendicular electric fields respectively. The probe cumulative phase change through the TIR optic would add in a root mean squared manner (100 bounces will induce 10 times the phase shift) unless the signal and probe beams are optically phase locked.

The TIR based interconnect approach ordinarily employs a time compensated reading methodology which provides a means for correcting optical delays which occur in a serial reading beam architecture due to the time required for the probe beam to propagate. The probe optical beam has a propagation time of nd/c, where n is the material index of refraction, d is the distance and c is the speed of light. For a large array this propagation delay can seriously degrade the receiver temporal response. For example, a thousand element fiber array of 100 $\mu$m diameter fibers would take 600 ps to read. With a time compensated architecture the arrival of the signal beam at the transcription site is made to be synchronous (either on a row by row or element by element basis) with the arrival of the reading (probe) beam so that propagation delays do not accumulate. This is accomplished by inserting an equivalent (compensating) optical delay in a prescribed manner into the signal beam.

Figure 3:
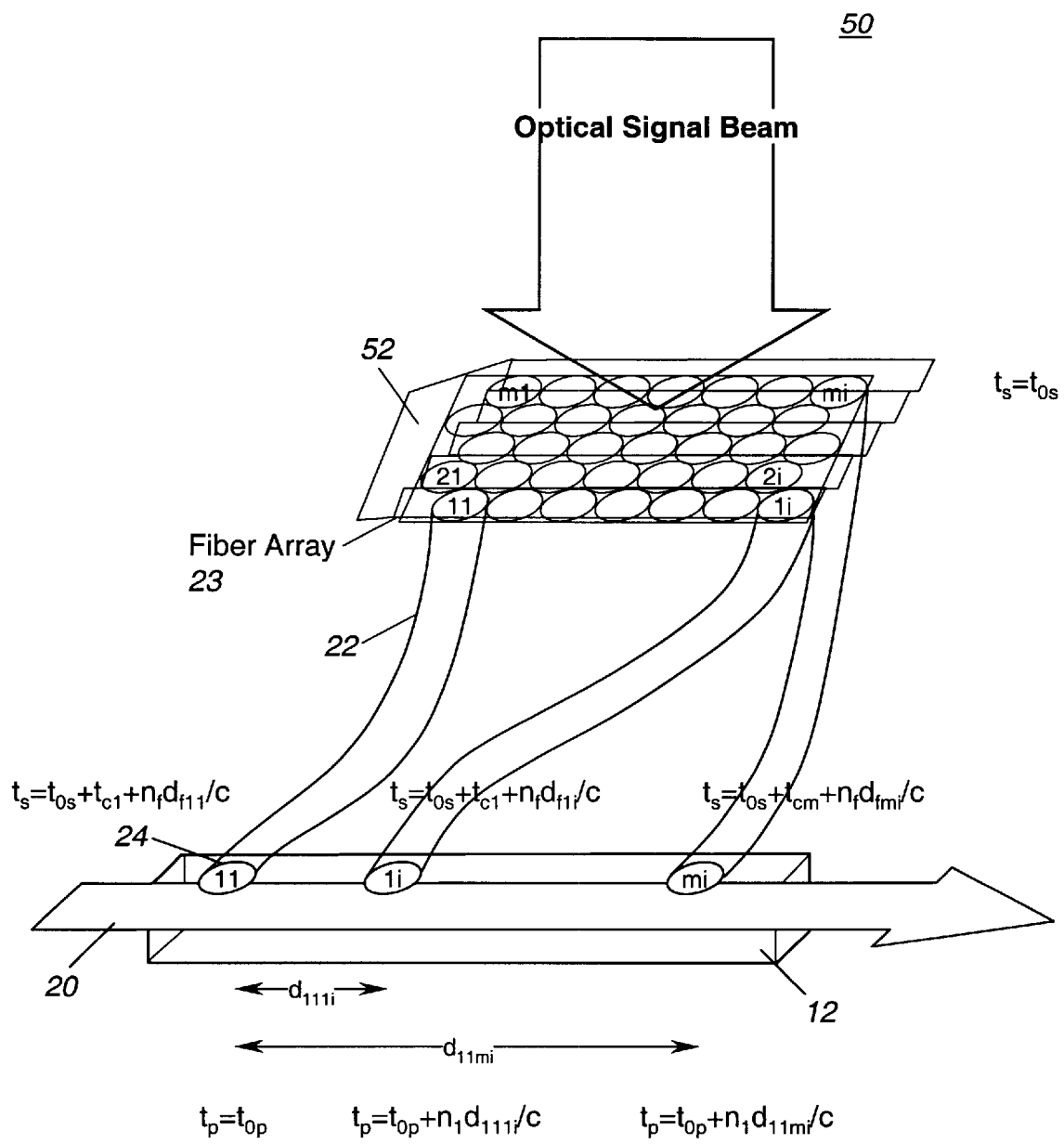
FIG. 3 is a diagram illustrating a configuration for providing time compensation for use with a serial reading technique in accordance with the present invention.

FIG. 3 shows a one dimensional time compensation system for a serial reading device, generally illustrated by the numeral 50. Many of the parts of the system 50 are identical in construction to like parts in the apparatus illustrated in FIGS. 1 and 2 described above, and accordingly, there have been applied to each part of the system in FIG. 3 a reference numeral corresponding to the reference numeral that was applied to the like part of the apparatus described above and shown in FIGS. 1 and 2. A collected optical signal arrives at a time compensation element (TCE) 52. The TCE 52 comprises an optical wedge of the kind that is commercially available from several optical device manufacturers. The optical wedge is configured as an m x i matrix. As the TCE 52 lies in front of the optical fiber array 23. The optical signal at time $t_{s=tos}$, transmits through the TCE 52 and propagates to the interaction area 18 at the end of the fiber at time $$t_s = t_{os} + t_{cm} + n_f d_{fmi}/c$$

where $t_{cm}$ is the time delay in row m of the TCE 52, $n_f$ is the index of refraction of the optical fiber 22, $d_{fmi}$ is the length of the optical fiber in row m and column i, and c is the speed of light.

If the fibers 22 are the same length and no time compensation element is included, then the probe beam 20 and the signal beam 24 accumulate a temporal error equal to $n_1 d_{11mi}/c$ which degrades the array's temporal resolution. The time compensation optical element 52 with $t_{cm} = n_1 d_{m1mi}$ serves to synchronize the probe beam 20 and the optical signal beam 24 at a point in each row of the array so that the temporal degradation is reduced.

Thus, each row is compensated. More particularly, the center element in each row is synchronized with the probe beam 20. Note the other elements in each row are not synchronized. Thus, this technique has some temporal resolution error associated with it, which would be analogous to time jitter. For a square fiber bundle 23, the one dimensional time compensation scheme allows the number of fibers to be squared (i.e., 10 fibers becomes 100 fibers) with the same temporal resolution (frequency bandwidth).

Figure 4:
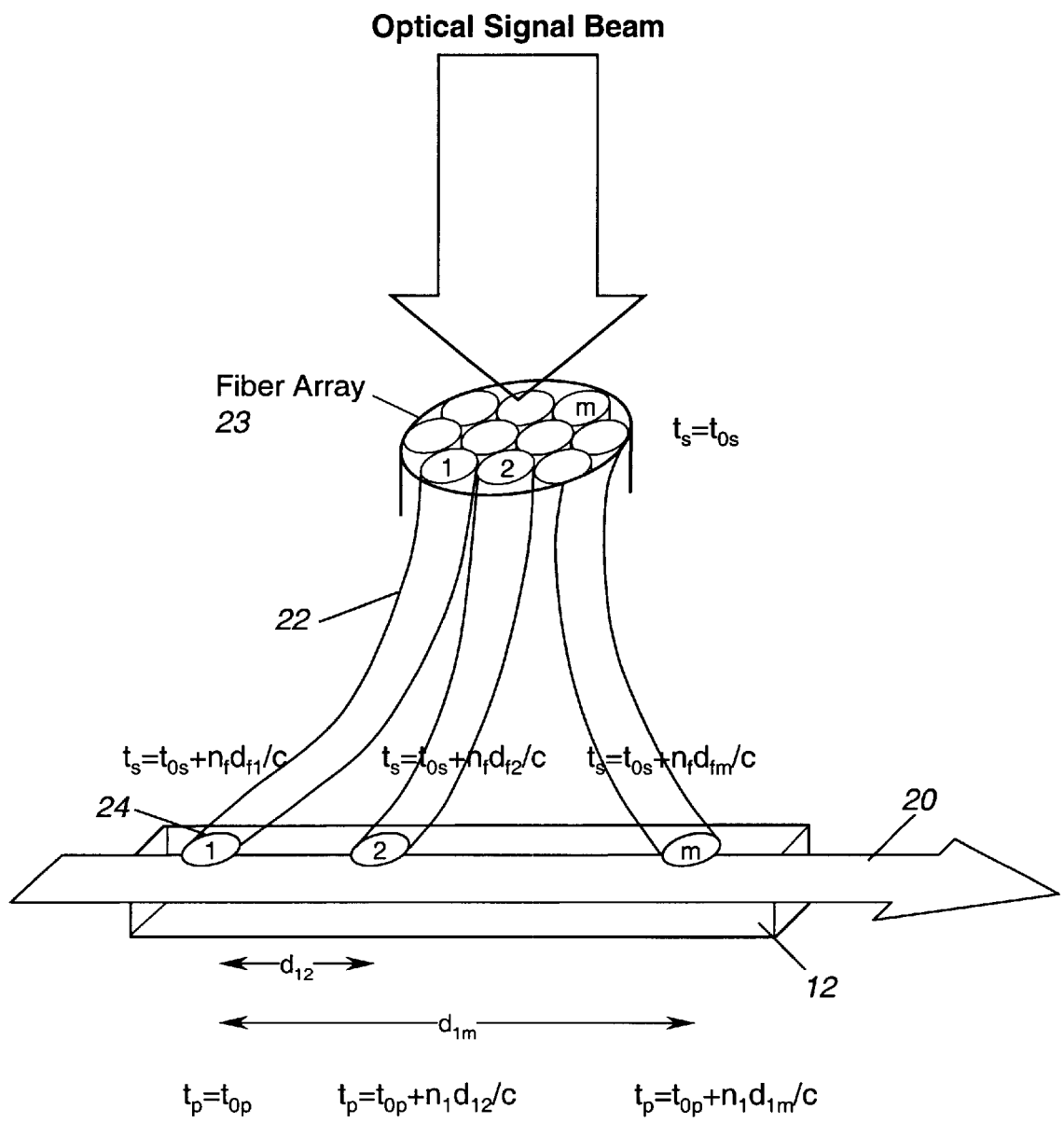
FIG. 4 is a diagram of another embodiment for providing two dimensional time compensation in accordance with the present invention.

FIG. 4 shows an element by element time compensation architecture. The optical signal beam arrives at the fiber array 23 at time $t_s = t_{os}$ and propagates to the interaction area 18 at the end of the fiber at time $$t_s = t_{os} + n_f d_{fm}/c$$

where $n_f$ is the index of refraction of the fiber 22, $d_{fm}$ is the length of fiber m, and c is the speed of light.

If the fibers 22 are the same length and no time compensation element is included, then the probe beam 20 and signal beam 24 accumulate a temporal error equal to $n_1 d_{1m}/c$ which degrades the array's temporal resolution. As, however, in accordance with this invention the fiber lengths are tailored such that $n_f(d_{fm} - d_{f1}) = n_1 d_{1m}$ the probe and signal beam are synchronized at each point in the array. Thus, this embodiment does not degrade the optical reading of the probe beam.

Alternatively, active or nonsynchronous passive time compensation architectures can be implemented to provide additional functional capability (for example, dynamically controlled probe sequences) or environmental corrections. An optical interferometer or polarizer may be utilized to convert the phase or polarization rotation modulated signal into an amplitude modulation. The time compensated methodology may be used in all the embodiments of optical interconnects when it is desired to correct time delays.

Figures 5, 6:
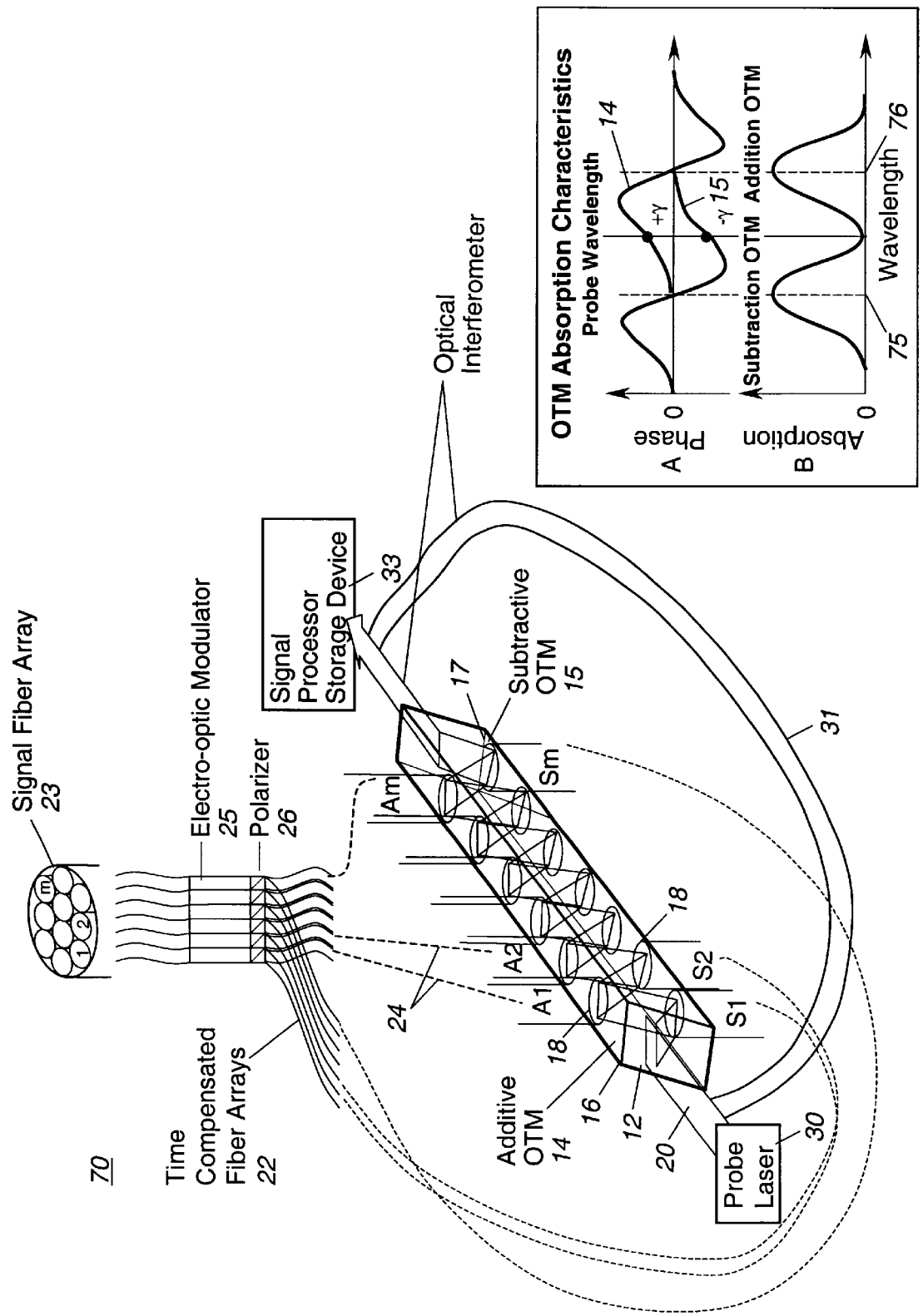
FIG. 5 is a diagram illustrating another embodiment of the optical interconnect configured for adding and subtracting optical signals in accordance with the present invention.

Referring now to FIG. 5, an alternative embodiment of the optical device, generally designated by the numeral 70, is shown. The device 70 is configured to perform addition and subtraction logic functions, as will be subsequently described.

Many of the parts of the optical device 70 are identical in construction to like parts of the device 10 illustrated in FIGS. 1 and 2. Accordingly, there has been applied to each part of the device 70 a reference numeral corresponding to the reference numeral that was applied to a like part of the device described above. The fundamental difference is that a layer of subtractive OTM 15 covers the lower surface 17 of the optical waveguide 12.

The OTM element 15 is similar to the OTM 14 except that it imparts a negative phase shift to the probe upon photo-excitation of the OTM. The OTM absorption characteristics are illustrated in FIG. 6A which shows phase versus wavelength for OTM 14 as +γ and for OTM 15 as −γ. FIG. 6B shows absorption versus wavelength for the subtraction OTM 15 and for the addition OTM 14. Note that phase is generally considered as the Kramer's Konig relation of the absorption versus wavelength graph. As shown, at resonance, illustrated by the dashed lines 75, there is no phase shift. Thus, the wavelength of the probe beam 20 is selected such that the negative OTM 15 provides a negative phase change that is equal to the positive phase change provided by the positive OTM 14. This occurs when the probe wavelength lies in between the two OTM absorption profiles, shown by the numeral 76. It is know that the absorption wavelengths can be controlled by structure (for example, in quantum well devices, nanocrystals), chemical composition (for example, changing side chemical groups in conjugated polymers, relative elemental composition), or externally applied electric or magnetic fields. The arithmetic sum of the interconnect is measured by looking at the relative phase shift or polarization rotation of the probe.

Also, each fiber path includes an electro-optic modulator 25 and a polarizer 26. The modulators 25 rotate polarized signal beams. The polarizers 26 serve to orthogonally polarize the signal beams so as to provide polarized signals with one containing the additive information (shown as $A_l \ldots A_m$) and the other containing the subtractive information (shown $S_l \ldots S_m$). As illustrated, the optical fibers 22 carrying the optical signals 24 are selectively propagated to the additive OTM 14 at the interaction area 18 and to the subtractive OTM 15 at its corresponding interaction areas.

In the event that amplitude modulation of the eprobe beam is required for further signal processing an optical interferometer can be utilized for the conversion. For this a reference beam from the probe laser 30 must be applied to the signal processor 33. Hence, an optical path 31 (see FIG. 5) is supplied to propagate the reference beam. Note that this is not needed if the probe can carry phase encoded information.

The passive time compensation architectures shown in FIGS. 3 and 4 need to be incorporated into the signal fiber array, if it is desired to synchronize the probe and pump at each point in the interconnect 70. Also, active or nonsynchronous passive time compensation architectures can be implemented to provide additional functional capability (for example dynamically controlled probe sequences) or environmental corrections.

Referring now to FIGS. 7 and 8, another embodiment of the optical interconnect 80 is shown. Many of the elements of the interconnect 80 are identical to like parts of the interconnect 70 illustrated in FIGS. 5 and 6 and like reference numerals are applied to the elements. The fundamental difference is that in this embodiment, the OTM 14 is characterized as having additional absorption and gain of the probe upon photo-excitation. This is designated by the numeral 14 on FIG. 8, where the maximum change in absorption, +β, occurs at the operating probe wavelength 82. The subtractive OTM 15 has a characteristic that exhibits negative absorption and loss that equals −β at the probe wavelength upon excitation and is shown as the numeral 15 in FIG. 8. The combined signal will be the additive of magnitude of the optical signals 24. In other words, the arithmetic sum of the interconnect 80 is measured by looking at the relative amplitude of the probe 20.

Figure 10:
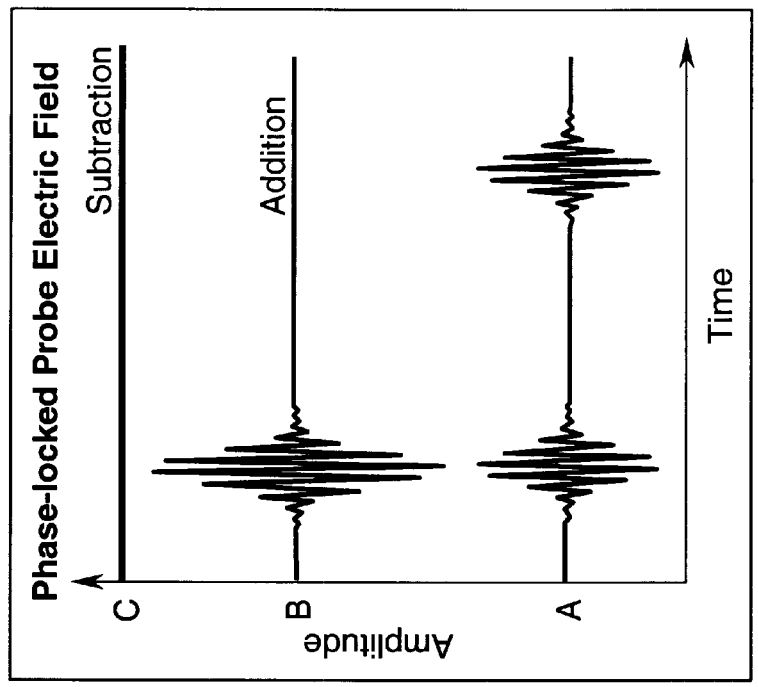
FIGS. 10A, B, and C shows the waveforms of the phase locked probe electric fields associated with the optical addition/subtraction technique illustrated in FIG. 7.
Figure 9:
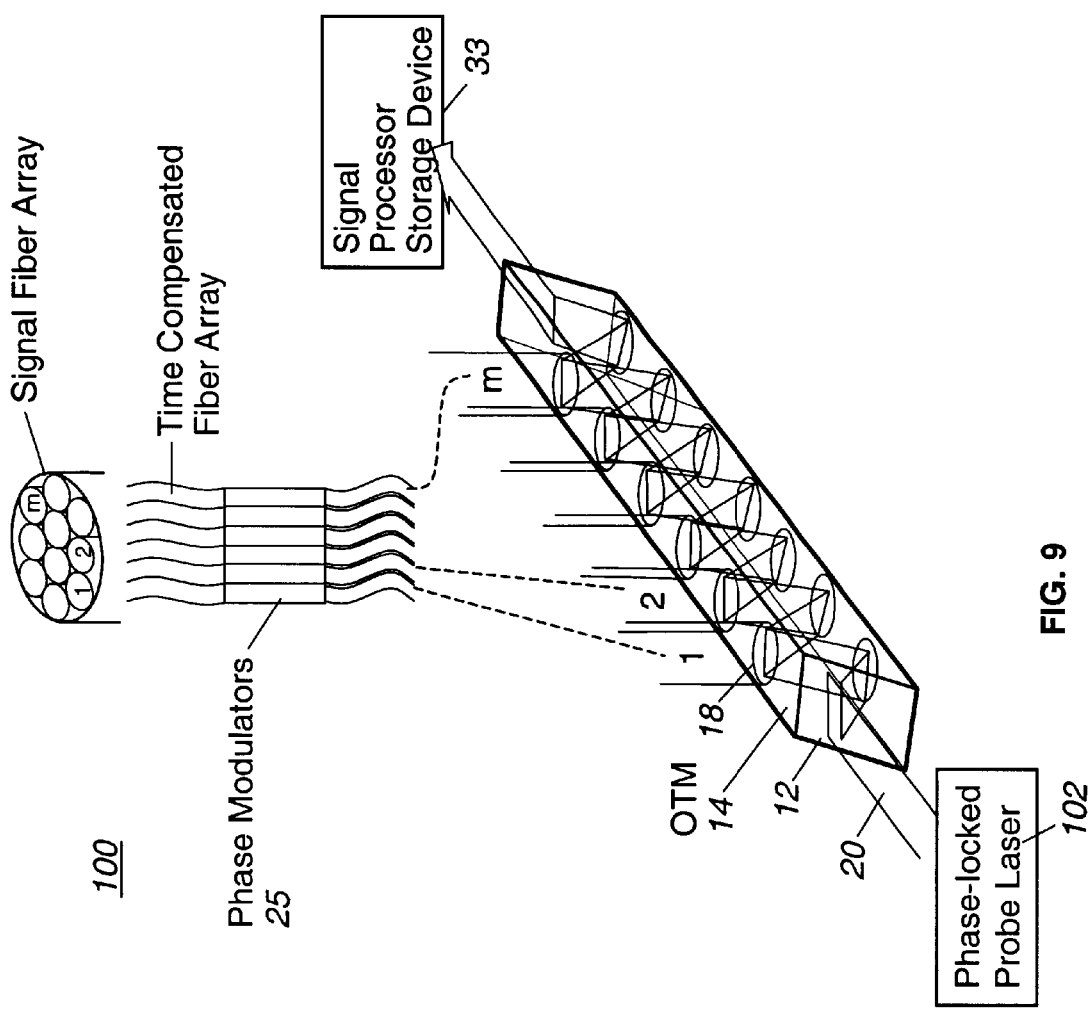
FIG. 9 is a diagram illustrating yet another embodiment of the present invention with a phase locked loop configuration.

With reference to FIGS. 9 and 10, an optical architecture 100 for a phase-locked optical interconnect is illustrated. As shown, optical addition and subtraction of signals is accomplished by utilizing a phase-locked signal and probe laser 102. Phase-locking necessitates that the relative phases of the signals and probe electric fields are constant over the reading time of the interconnect (see FIG. 10). FIG. 10 shows the electric fields over time. FIG. 10A shows two separate unsynchronized electric field pulses. With reference to FIG. 7B, addition is accomplished if the signal and probe electric fields are in-phase with each other, which produces constructive interference between the two beams. This is achieved by adding a time delay configuration such that the two pulses overlap, which results in a single pulse having a greater amplitude. Subtraction is accomplished if the signal and probe electric fields are out-of-phase with each other, which produces destructive interference between the two equal amplitude beams. This is shown in FIG. 10C. The relative phases of the probe and each individual signal electric field can be controlled dynamically by using either an array of phase modulators 25 or active time compensation architectures. In this instance, the arithmetic function can be controlled in real time.

For applications that simply require a predetermined operation between specified signal fibers, passive time compensation architectures can be implemented to provide the required phase delay. Partially phased beams are also possible and may be of interest for certain signal processing applications (for example, data encryption), in these instances the relative phase between the probe and signal electric fields may lie between in-phase and out-of-phase conditions.

Obviously, many modifications and variations of the present invention are possible in light of the above teachings. Thus, it is to be understood that, within the scope of the appended claims, the invention may be practices otherwise than as specifically described above.

What is claimed and desired to be secured by Letters Patent of the United States is:

1. An optical interconnect for use with a probe beam and optical information signals comprising:
    an optical waveguide for propagating the probe beam and including means responsive to the optical information signals for changing a characteristic of the probe beam locations where the optical information signals interact with the probe beam; and
    processing means responsive to said changed characteristic and operative to develop an output signal representative of the information contained in the received optical information signals.

2. The optical interconnect as recited in claim 1 wherein the information signals are amplitude modulated.

3. The optical interconnect as recited in claim 1 wherein the information signals are phase modulated.

4. The optical interconnect as recited in claim 1 wherein said received optical information signals are polarized.

5. The optical interconnect as recited in claim 1 wherein said means for changing includes an optical transcription material (OTM).

6. The optical interconnect as recited in claim 5 wherein said OTM is characterized by an index of refraction that varies over time, said varying index of refraction serving to modulate the probe beam with the information contained in each optical information signal.

7. The optical interconnect as recited in claim 6 wherein said OTM comprises a polymer.

8. The optical interconnect as recited in claim 6 wherein said OTM comprises a semiconductor material.

9. The optical interconnect as recited in claim 6 wherein said optical device comprises a photoactive material.

10. The optical interconnect as recited in claim 5 wherein said optical waveguide has a layer of the OTM over a surface that defines a plurality of interaction areas, said probe beam reflecting through said waveguide at said interaction areas, said optical information signals serving to change the index of refraction of said OTM at said interaction areas.

11. The optical interconnect as recited in claim 10 and further comprising a matrix of optical fibers interconnecting the optical information signals to said interaction areas.

12. The optical interconnect as recited in claim 11 and further comprising time compensation means for synchronizing the matrix of optical information signals propagated by said matrix of optical fibers.

13. The optical interconnect as recited in claim 12 wherein said matrix comprises m columns and i rows, and wherein the central optical fiber in each column is synchronized.

14. The optical interconnect as recited in claim 13 wherein each optical fiber comprises a length having a dimension for synchronizing said matrix of optical information signals.

15. An optical device for adding a first optical information signal and a second optical information signal and for use with a probe beam, said device comprising:
    an optical element characterized as having an index of refraction, that varies in response to an optical information signal, such that when the first optical information signal interacts with the probe beam the index of refraction of the optical element has a first value corresponding to the first optical information signal, and when the second optical information signal interacts with the probe beam the index of refraction of the optical element has a second value corresponding to the second optical information signal;
    said first and second values being additive, thereby developing an output beam corresponding to the first and second values and representative of the addition of said first and said second optical information signals; and
    means for processing said output beam.

16. The optical device as set forth in claim 15, wherein said optical element includes an optical transcription material (OTM).

17. The optical device as set forth in claim 15 and further comprising a first optical fiber for propagating said first optical information signal to said optical element, and a second optical fiber for propagating said second optical information signal to said optical element.

18. The optical device as set forth in claim 17 wherein said waveguide is subjacent said optical element.

19. The optical device as set forth in claim 15 and further comprising modulator means for developing first and second optical information signals that have the same phase.

20. The optical device as set forth in claim 15 and further comprising modulator means for developing first and second optical information signals that are out-of-phase, such that said second optical information signal subtracts arithmetically from said first optical information signal.

21. The optical device as set forth in claim 15 wherein the second optical signal is out-of-phase with said first optical signal, whereby said output beam corresponds to the difference between said first and said second optical information signals.

22. The optical device as set forth in claim 15 and further comprising an optical waveguide.

23. The optical device as set forth in claim 22 wherein said optical waveguide produces a totally internally reflected signal.

24. The optical device as set forth in claim 15 and further comprising means for combining said first and said second optical information signals, and an optical fiber for propagating said first and said optical information signals to said optical element.

25. The optical device as set forth in claim 15 wherein said first and said second optical information signals are polarized.

26. The optical device as set forth in claim 25 wherein said probe beam is oriented at 45° from both said first and said second optical information signals.

27. The optical device as set forth in claim 26 wherein said optical element comprises an anisotropic OTM.

28. The optical device as set forth in claim 23 wherein said optical waveguide has opposed lateral surfaces, and further comprises a first layer of an OTM covering one surface and a second layer of an OTM covering the opposed surface.

29. The optical device as set forth in claim 28 wherein said first layer comprises a positive OTM and said second layer comprises a negative OTM.

30. The optical device as set forth in claim 28 wherein said first layer exhibits positive absorption and gain, and said second layer exhibits negative absorption and gain.

\* \* \* \* \*